(12) United States Patent
Squire et al.

(10) Patent No.: US 7,843,768 B2
(45) Date of Patent: Nov. 30, 2010

(54) SYSTEM FOR COMMUNICATING LOCATION OF SURVIVORS IN MINE EMERGENCIES

(76) Inventors: James C. Squire, 1949 Mountain View Rd., Buena Vista, VA (US) 24416; Gerald A Sullivan, 75 Charity La., Lexington, VA (US) 24450; George W Flathers, III, 7392 Endless View La., Rilleyville, VA (US) 22737

( * ) Notice: Subject to any disclaimer, the term of this patent is extended or adjusted under 35 U.S.C. 154(b) by 106 days.

(21) Appl. No.: 12/082,587

(22) Filed: Apr. 11, 2008

(65) Prior Publication Data

US 2009/0257316 A1    Oct. 15, 2009

(51) Int. Cl.
*H04B 1/02* (2006.01)
(52) U.S. Cl. .................................... 367/137
(58) Field of Classification Search ............... 367/137, 367/191, 907
See application file for complete search history.

(56) References Cited

U.S. PATENT DOCUMENTS

| | | | |
|---|---|---|---|
| 3,273,112 A * | 9/1966 | Hobson | ............ 367/191 |
| 4,066,992 A | 1/1978 | Buller | |
| 6,584,406 B1 | 6/2003 | Harmon | |
| 6,928,030 B2 | 8/2005 | Chamberlain | |
| 7,149,472 B2 | 12/2006 | Reagor | |
| 7,307,915 B2 | 12/2007 | Kimball | |
| 7,382,690 B2 * | 6/2008 | Nemeth | ............ 367/178 |
| 2007/0250269 A1 | 10/2007 | Wei | |
| 2008/0021658 A1 | 1/2008 | Pavel | |
| 2009/0207693 A1 * | 8/2009 | Schuster | ............ 367/38 |

FOREIGN PATENT DOCUMENTS

| | | |
|---|---|---|
| WO | WO/2004/068169 | 8/2004 |
| WO | WO/2005/002066 | 1/2005 |
| WO | WO/2006/067432 | 6/2006 |
| WO | WO/2007/143744 | 12/2007 |

OTHER PUBLICATIONS

George Flathers III, Emergency Underground Communication Using Seismic Waves, Symposium: Proceedings of the National Conference on Undergraduate Research 2007, Apr. 14, 2007, Dominican University of California, San Rafael, California.
Discovery Channel Canada featured on May 23, 2007, posted at http://academics.vmi.edu/ee_js/Research/ELFSD/ELFSD.htm, Discovery Channel link.
WSLS TV Channel 10 out of Roanoke, VA featured no earlier then May 15, 2007, posted at http://academics.vmi.edu/ee_js/Research/ELFSD/ELFSD.htm, WSLS link.

* cited by examiner

*Primary Examiner*—Ian J Lobo
(74) *Attorney, Agent, or Firm*—Daniel L. Fitch; Wharton, Aldhizer & Weaver, PLC

(57) ABSTRACT

The disclosed system uses seismic signaling to locate survivors in a mine collapse. A separate transmitter with a specific pre-selected frequency or frequencies is placed in pre-positioned safety zones of a mine. The system generates frequency-locked, unmodulated seismic energy, which allows rescuers to identify the safety zone where a transmitter is activated. The transmitter comprises an oscillator that generates the signal. The oscillator drives the transducer. The transducer causes the inertial mass to move. The movement of the inertial mass generates the seismic waves, which are conducted through the pressure plate to the earth. The seismic signal is detected then amplified, filtered, converted and then processed. The use of a continuous signal enables the processing unit to identify the frequency of the signal with a very low error rate, using frequency content identification. The disclosure also describes a method for transmitting seismic waves through the earth using the above described system.

2 Claims, 9 Drawing Sheets

SYSTEM FOR COMMUNICATING LOCATION OF SURVIVORS IN MINE EMERGENCIES

CROSS REFERENCE TO RELATED APPLICATION

Not Applicable.

FEDERALLY SPONSORED RESEARCH

Not Applicable

SEQUENCE LISTING PROGRAM

Not Applicable.

BACKGROUND

Mining continues to be one of the most dangerous industries in America, as evidenced by the recent collapse in the Crandall Canyon Mine in Utah, and the Sago Mine in West Virginia. When a mine collapses it can leave survivors stranded over 1000 feet below the surface with all means of communications cutoff. Landlines, which serve as the primary means of communication, are instantly severed by the force of the collapse, and radio signals are not able to penetrate the earth; therefore, the survivors are unable to communicate with the surface. The highest priority after a mine collapse is to drill into an area near where the survivors are located, create an air shaft and pump in oxygen. The severing of the land lines by the collapse, however, makes it difficult, if not impossible to identify the location of the survivors. Because every hour counts, rescue crews need a reliable and precise means of locating and communicating with survivors.

The currently available communication systems for use in mines comprise of a mix of wired, radio, wireless and Through the Earth communication systems. Wired transmissions depend on signals sent along wires and cables. As mentioned, wires and cables are susceptible to being snapped or damaged in a mine collapse. Radio signals require open air for signal propagation; therefore, mine collapses block the radio signals. Wireless systems often employ a special antenna cable called a "leaky feeder" to form a back bone for the wireless transceivers, allowing the signal to hop for short distances along available conductors, such as electrical wires and water lines. Since wireless systems still require wire-bound components, they can fail during mine collapses when cables are broken. Through the Earth wireless systems send magnetic waves through the ground, but require extensive above the ground loop antennas in order to communicate with miners below. The loop antennas required can be hundreds of feet in size, if not larger. In addition, most Through the Earth systems communicate only one-way, surface to underground. In order to enable two-way communication, including underground to surface communication, the same extensive loop antennas would have to be located underground.

Information relevant to attempts to address these communication problems can be found in U.S. Pat. No. 7,307,915 (issued Dec. 11, 2007), U.S. Pat. No. 7,149,472 (issued Dec. 12, 2006), U.S. Pat. No. 6,928,030 (issued Aug. 9, 2005), U.S. Pat. No. 6,584,406 (issued Jun. 24, 2003), U.S. Pat. No. 4,066,992 (issued Jan. 3, 1978); U.S. patent application Ser. No. 2008/0021658 (published Jan. 24, 2008), U.S. patent application Ser. No. 2007/0250269 (published Oct. 25, 2007); PCT Publication Nos. WO/2007/143744 (published Dec. 13, 2007), WO/2006/067432 (published Jun. 29, 2006), WO/2005/002066 (published Jan. 6, 2005), WO/2004/068169 (published Aug. 12, 2004). However, each of these references suffers from one or more of the following disadvantages: 1) transmits a short duration signal, or a frequency modulated signal that can be missed in the enormous background noise of the earth; 2) transmits a broad range frequency signal that can be masked by the background noise of the earth; 3) transmits signals only from the surface to underground; 4) uses very large seismic wave transmitters; and 5) requires extensive infrastructure both above and below the ground.

Relevant facts: 1) George W. Flathers III, joint inventor, presented the paper titled "Emergency Underground Communication Using Seismic Waves" at the National Conference on Undergraduate Research 2007, on Apr. 14, 2007 at Dominican University of California in San Rafael, Calif.; 2) Discovery Channel Canada featured the disclosure on May 23, 2007 and a copy of the feature is posted at http://academics.vmi.edu/ee_js/Research/ELFSD/ELFSD.htm at the Discovery Channel link; 3) WSLS TV Channel 10 out of Roanoke, Va. featured the disclosure no earlier than May 15, 2007 and a copy of the feature is posted at http://academics.vmi.edu/ee_js/Research/ELFSD/ELFSD.htm at the WSLS link.

For the foregoing reasons, there is a need for an improved communication system for survivors of a mine collapse to contact the rescue teams above ground.

SUMMARY

The present invention is directed to an improved system of communication for survivors of a mine collapse to contact the rescue teams above. The present invention improves mine safety by using the best means of long distance communication through solid rock, seismic signaling. Seismic signaling does not require wires, large transmitters or extensive infrastructure, such as large loop antennas; instead it uses the earth itself to carry the signal. After a mine collapse, the survivors can activate the transmitter and the signal will travel through the earth to the above ground portable receiver. In order to help rescue crews identify the location of the survivors the transmitter sends a pre-selected, frequency-locked signal. Each of the many safe zones with known surveyed positions within the mine have separate transmitters, each having a specific pre-selected frequency. Therefore, when the frequency is picked up by the above ground portable receiver, the rescue teams will know exactly the position of the survivors and can begin their rescue efforts.

Since the frequency-locked signal is sent for a relatively long duration, compared to seismic shots or a modulated signal that varies with time, it can be effectively separated from the background noise of the earth. This is because the signal is frequency-locked and continuously transmitted, the received signal to noise power per unit resolvable Hertz ("Hz") grows linearly with time, unlike the currently employed methods using frequency modulated signal or impulsive noise. This enables the signals sent by the transmitter, which are relatively weak compared to the ambient noise, to be identified over time.

The present invention provides one-way underground to surface communication and can provide for two-way communication, including surface to underground as transmitters can be placed on the surface and the portable receivers can be used underground. The present invention transmits seismic waves through the earth using a relatively small transmitter, which is practically suited to the limited space within safe zones in mines. Some prior transmitters make use of large seismic vibrators and explosives to create the seismic shots, which are impractical for use in a mine. In addition, the present invention transmits a signal through the earth without the need for extensive infrastructure, such as loop antennas that can be over one hundred feet in size.

The present invention comprises a system for the transmission of seismic waves through the earth comprising a source of periodic, frequency-locked, unmodulated seismic energy and a receiver. For clarification only, periodic means that the wave form of the signal repeats itself; frequency-locked means that the system transmits a specific frequency; and unmodulated means that neither the amplitude, nor frequency are changed during the transmission. The signal is generated by a frequency-locked, electrical, oscillator, which generates a signal of insufficient power to directly drive the seismic transducer without power amplification. An embodiment of the present invention comprises a crystal or digitally-synthesized oscillator, which generally are electronic circuits.

The system further comprises an amplifier coupled to the oscillator for increasing the power of the signal produced by the oscillator.

The system further comprises a transducer driven by the oscillator, wherein the transducer is electrically-controlled. The transducer converts the electrical signal into seismic energy. An embodiment of the present invention comprises an electromagnetic transducer. An electromagnetic transducer generally comprises two magnets. The first magnet is an electromagnet driven by the oscillator. The second magnet is moved by the electromagnet. The periodic movement of the second magnet creates seismic waves.

A further embodiment of the present invention comprises a transducer that is a piezoelectric crystal, piezoelectric ceramic, linear motor, electro-pneumatic, pneumatic, or hydraulic transducer.

The system further comprises an inertial mass coupled to the transducer. The inertial mass is a body of sufficient size such that its cyclic motion produces seismic energy. The transducer causes the inertial mass's periodic movement, which creates the periodic seismic waves. In the embodiment, wherein the transducer is an electromagnetic transducer, the inertial mass comprises the second magnet of the electromagnetic transducer and any structures attached to the second magnet that move relative to the transducer.

The system further comprises a pressure plate coupled to the transducer. The pressure plate mounts the system to the earth.

The system further comprises a receiver comprising a geophone coupled to the earth, an amplifier coupled to the geophone, an analog to digital ("A/D") converter coupled to the amplifier, and a processing unit coupled to the A/D converter for frequency content identification of the signal. The frequency content identification is performed in the processing unit using Fourier transforms, wavelet transforms, digital finite impulse response filters or digital infinite impulse response filters or other algorithms that can identify the frequency-specific signal energy content known to those skilled in the art.

An embodiment of the receiver further comprises a differential amplifier, a filter, and an amplifier. The differential amplifier is coupled to the geophone. A filter is coupled to the differential amplifier. An amplifier is coupled to the filter. An analog to digital ("A/D") converter is coupled to the filter. A processing unit is coupled to the A/D converter for frequency content identification of the signal, wherein the processing unit performs Fourier transforms in order to identify the power in all received signal frequencies.

The present invention further comprises a method for the transmission of seismic waves through the earth comprising creating a continuous, periodic, frequency-locked electrical signal; transducing the continuous signal into seismic waves that pass through the earth; receiving the seismic waves from the earth; transducing seismic waves into electrical signal; passing the electrical signal through signal processing stages comprising amplification and filtering, in any order; converting the analog signal into a digital signal; identifying the frequency content of the signal.

An embodiment of the present invention further comprises a bearing system engaging the inertial mass and coupled to the pressure plate. The bearing system limits the off axis motion of the inertial mass.

An embodiment of the present invention comprising a bearing system further comprises mounting brackets attached to the bearing system and attached to the pressure plate, wherein the mounting brackets are adjustable in order to modify the center of travel of the inertial mass.

An embodiment of the present invention further comprises an adaptor engaging the transducer and attached to the pressure plate for conducting the seismic waves produced by the transducer to the pressure plate.

DRAWINGS

DEFINITIONS

Periodic means that the wave form of the signal repeats itself.

Frequency-locked means that the system transmits a specific frequency.

Unmodulated means that neither the amplitude, nor frequency is changed during transmission.

Coupled is used when describing electrical connections and when describing two structures that either directly contact or attach indirectly via another structure such that it is possible to transmit forces or constrain the relative motion between the structures.

Engaging means contacting but not fastened to.

Pressure plate is the contact point between the transmitter and the earth. The pressure plate is used to mount the system to the earth.

A bearing system, generally, has two functions: 1) to limit off axis motion of the inertial mass, so that the movement of the inertial mass is linear in nature; and 2) to provide a restorative force in order to bring the inertial mass back to a neutral starting position after each movement. The bearing system of the present invention need not provide both functions as different types of transducers may have one of the above functions built-in. In addition, the bearing system need not be an additional structure. For example, the embodiment wherein the transducer comprises a linear motor, the bearing system is built into the transducer.

Inertial mass means a body of sufficient size such that its cyclic motion produces force, and this force produces seismic waves when coupled to the earth.

DESCRIPTION

Figure 1:
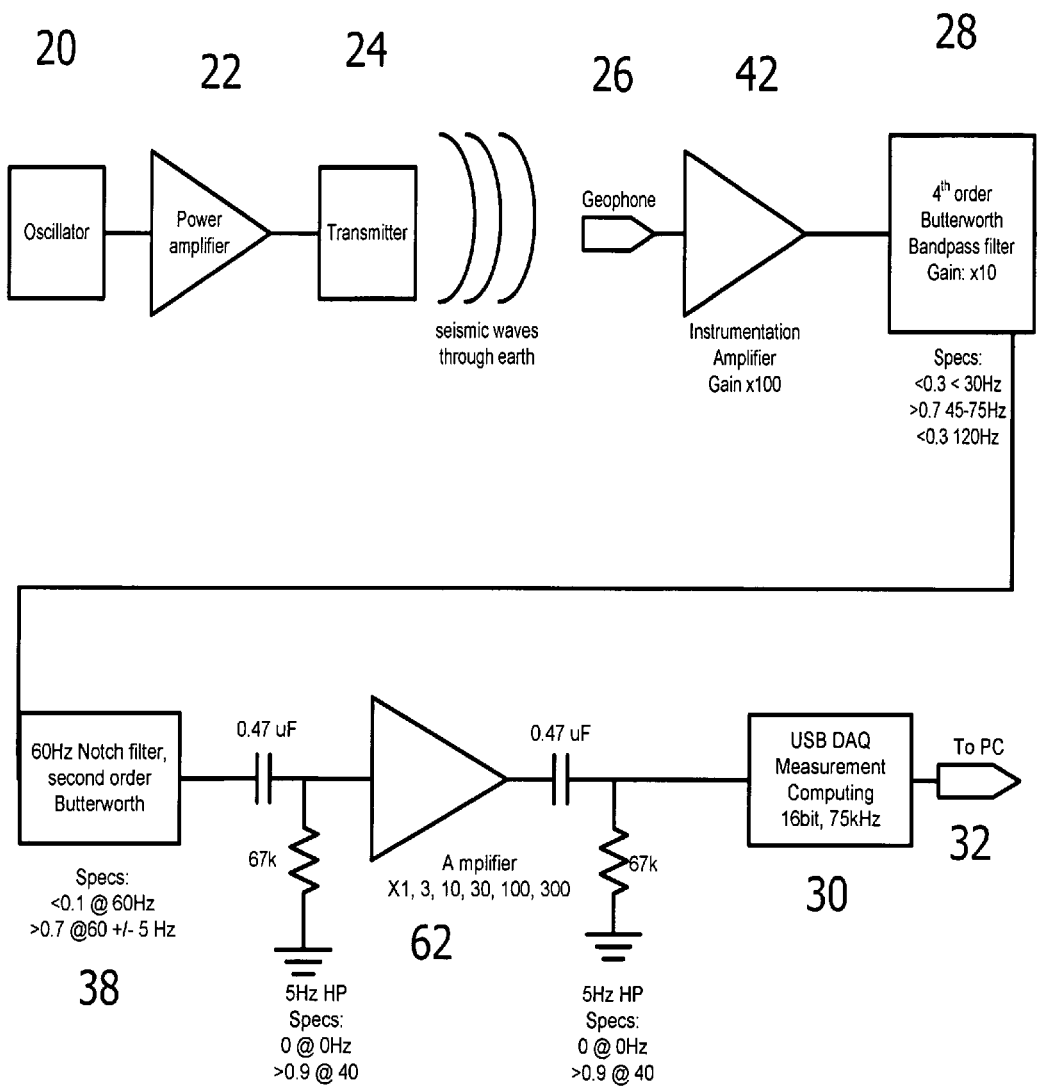
FIG. 1 is a block diagram of an embodiment showing the system for transmission of seismic waves through the earth.
Figure 2:
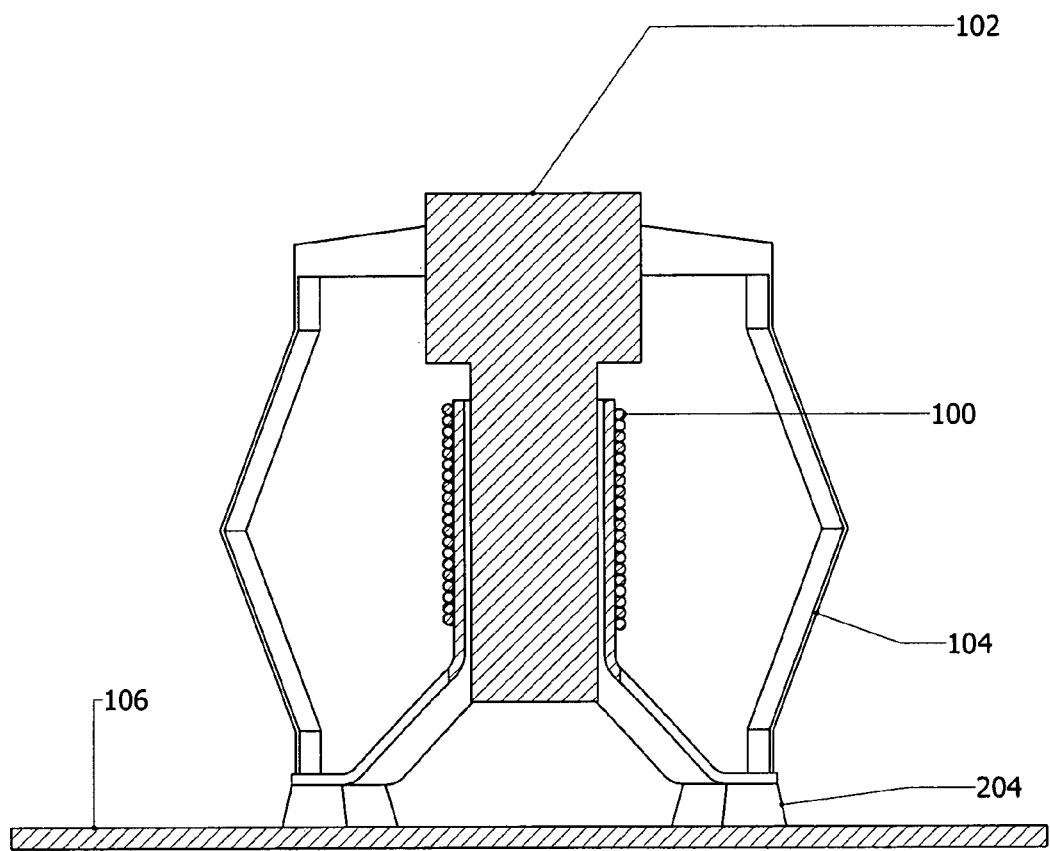
FIG. 2 is a side view cross section of an embodiment of the source of seismic energy.
Figure 3:
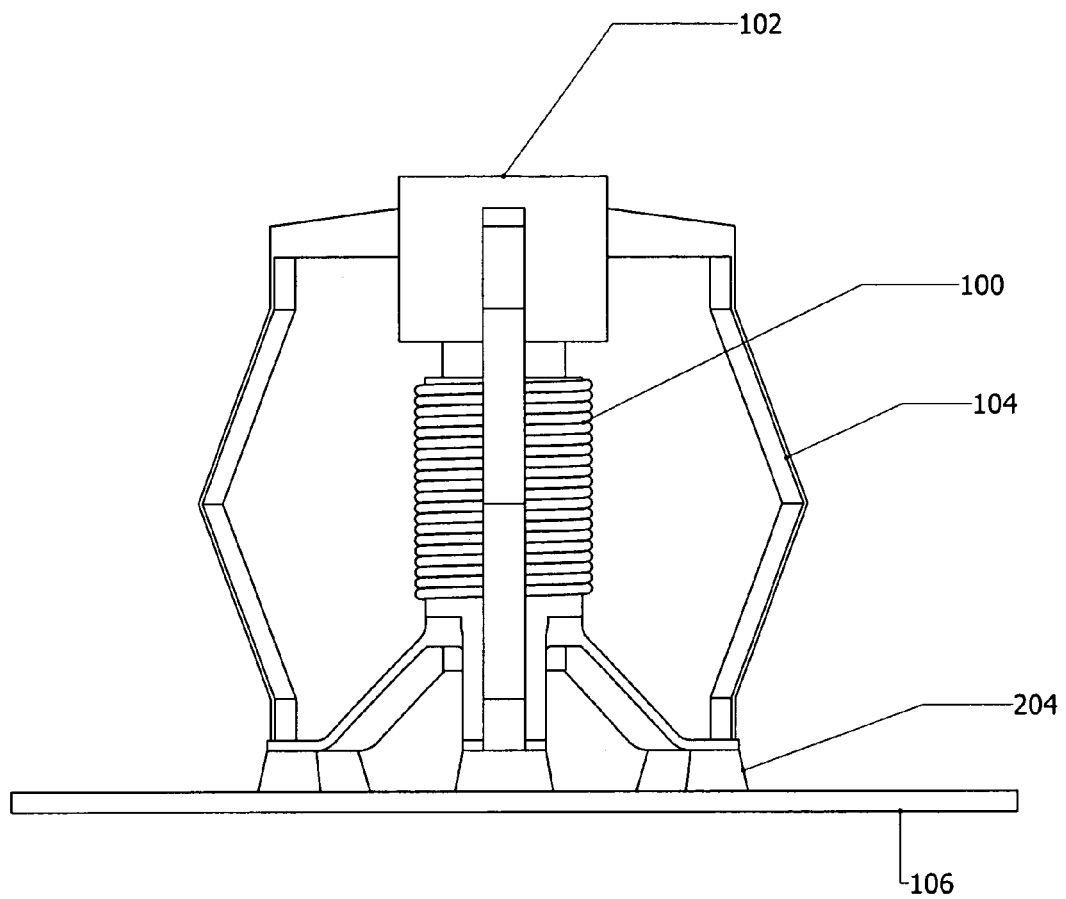
FIG. 3 is a side view schematic view of an embodiment of the source of seismic energy.
Figure 4:
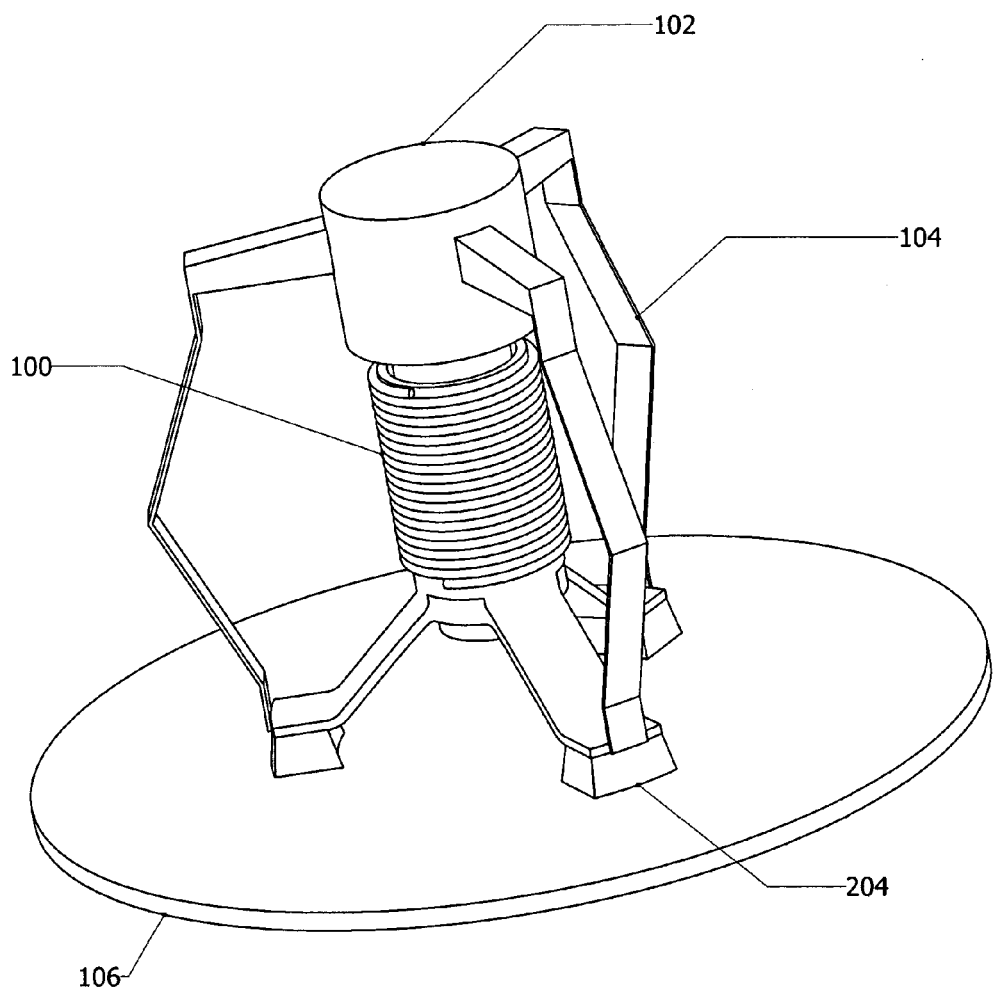
FIG. 4 is an isometric view of an embodiment of the source of seismic energy.

A system for the transmission of seismic waves through the earth comprising a source of periodic, frequency-locked, unmodulated seismic energy comprising an oscillator 20, an amplifier 22, as shown in FIG. 1, a transducer 100, an inertial mass 102, and a pressure plate 106, as shown in FIG. 2. The system further comprises a receiver, as shown in FIG. 1, comprising a geophone 26, an amplifier 42, an analog to digital converter 30, and a processing unit 32.

A method for transmitting seismic waves through the earth comprising creating a continuous, periodic, frequency-locked electrical signal, transducing the continuous signal into seismic waves passing through the earth, receiving the seismic waves from the earth, transducing seismic waves into electrical signal, passing the electrical signal through signal processing stages comprising amplification and filtering, in any order, converting the analog signal into a digital signal, and identifying the frequency content of the signal.

As shown in FIG. 1, the oscillator 20 generates the signal. An amplifier 22 is coupled to the oscillator 20 in order to increase the power of the signal. The transducer 100, as shown in FIG. 2, is driven by the oscillator 20. As shown in FIG. 2, the inertial mass 102 is coupled to the transducer 100. The transducer 100 causes the inertial mass's 102 periodic movement, and this movement creates the periodic seismic waves. As shown in FIG. 2, the pressure plate 106 is coupled to the transducer 100. The pressure plate 106 mounts the system to the earth. The signal travels through the earth and is detected by the receiver. As shown in FIG. 1, the geophone 26 of the receiver is coupled to the earth in order to receive the seismic waves generated by the system. As shown in FIG. 1, an amplifier 42 is coupled to the geophone 26 to amplify the analog signal generated by the geophone 26. As shown in FIG. 1, the analog to digital ("A/D") converter 30 is coupled to the amplifier 42 in order to convert the signal into a digital format. As shown in FIG. 1, a processing unit 32 is coupled to the A/D converter 30. The processing unit 32 performs frequency content identification of the signal.

The source of periodic, frequency-locked, unmodulated seismic energy comprises an oscillator 20 for generating a signal, as shown in FIG. 1. The oscillator 20 is a frequency-locked, electrical oscillator 20, which produces a signal of insufficient power to directly drive the seismic transducer without power amplification. The oscillator 20 is tunable to the preferred frequency.

The oscillator 20 of an embodiment is a crystal or a digitally-synthesized oscillator 20. A crystal oscillator may be derived directly from an analog source. A digitally-synthesized oscillator may be derived from a crystal clock that feeds a microcontroller or computer.

The oscillator 20 may produce an analog or digital signal. If the oscillator 20 generates a digital signal, a digital to analog ("D/A") converter will be used to convert the signal into an analog format to drive the transducer 100.

The oscillator 20 can produce multiple frequencies simultaneously, which enables the transmission of multiple distinct messages from a single transmitter 24. An example of the multiple messages could include the pre-selected frequency specific to the safe zone, a pre-selected frequency identifying the number of survivors, and pre-selected frequency identifying the condition of the survivors.

The signal produced by the oscillator 20 comprises a frequency higher than the frequency of common environmental noise and lower than a frequency that is severely attenuated by the earth. The signal is produced at a frequency from 0 to 500 Hz, and preferably from 40 to 85 Hz. This frequency range was selected as large environmental noise sources were found below 40 Hz and it was discovered that the earth attenuates signals over 85 Hz.

The oscillator of an embodiment generates a waveform with a pure sinusoid fundamental frequency using an 8 bit microcontroller, a crystal-controlled oscillator and an 8 bit digital to analog converter.

The oscillator 20 may be powered by a battery or a DC power supply derived from an AC power source. There is a monotonically increasing relationship between the power transmitted and the power received.

The source of periodic, frequency-locked, unmodulated seismic energy further comprises an amplifier 22, as shown in FIG. 1, coupled to the oscillator 20, which increases the power of the signal. The amplifier could be electrical, pneumatic, or chemical.

The source of periodic, frequency-locked, unmodulated seismic energy further comprises a transducer 100, as shown in FIG. 2, driven by the oscillator 20. The transducer 100 is electrically-controlled. The transducer 100 converts the electrical energy of the oscillator 20 into force. The transducer 100 of an embodiment is selected from a group consisting of piezoelectric crystal, piezoelectric ceramic, linear motor, electromagnetic, electro-pneumatic, pneumatic, and hydraulic transducer. The transducer 100 of an embodiment is in direct contact with the earth. The transducer 100 of another embodiment, as shown in FIG. 2, is not in direct contact with the earth and the seismic waves produced by the transducer 100 are conducted to the earth via the pressure plate 106.

As shown in FIG. 2, the transducer 100 of an embodiment is an electromagnetic transducer comprising a first and second magnet, wherein the first magnet is an electromagnet driven by the oscillator 20. The second magnet is moved by the electromagnet. The periodic movement of the second magnet creates seismic waves.

Figure 5:
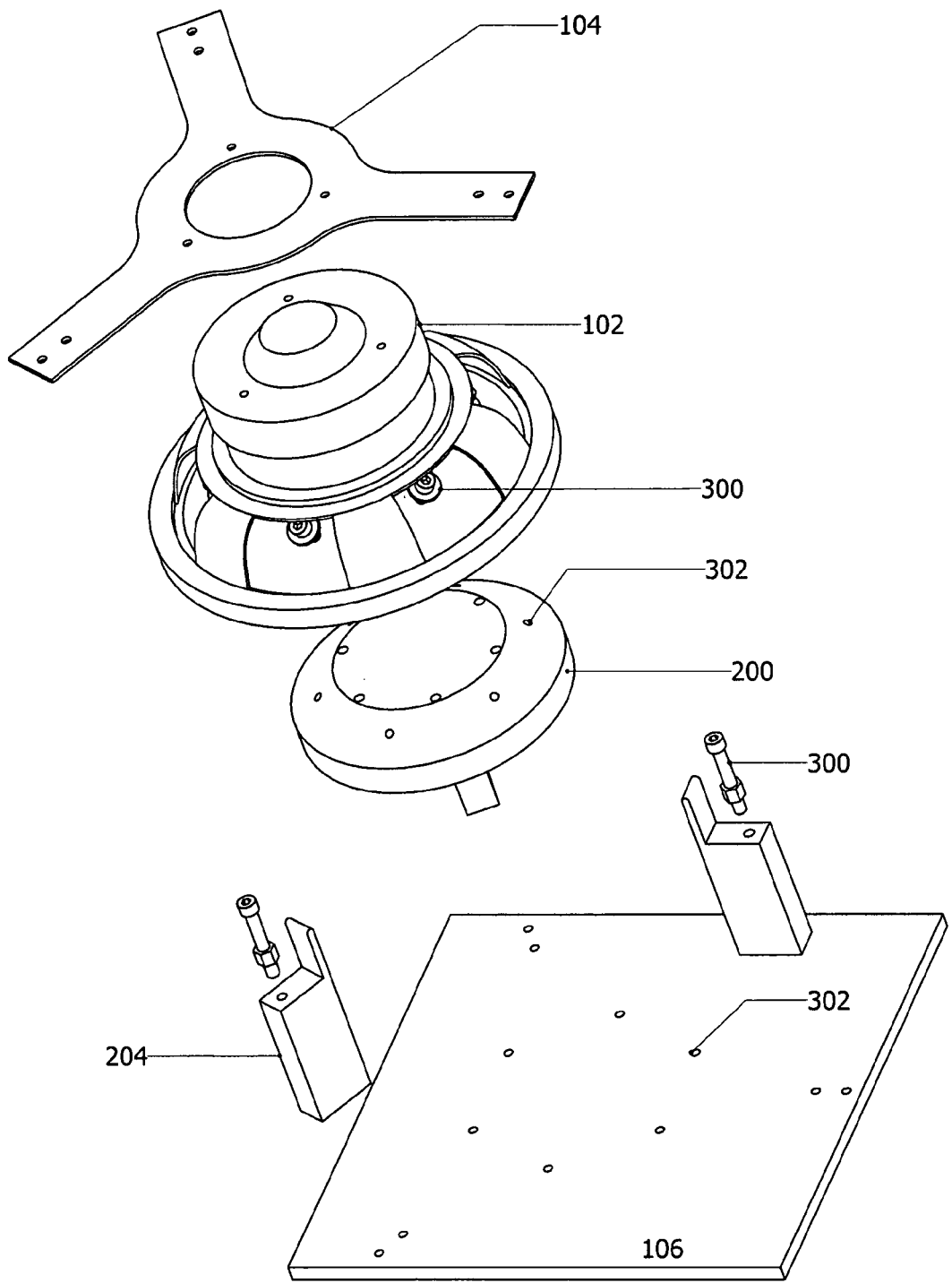
FIG. 5 is an isometric view of an embodiment of the source of seismic energy.
Figure 6:
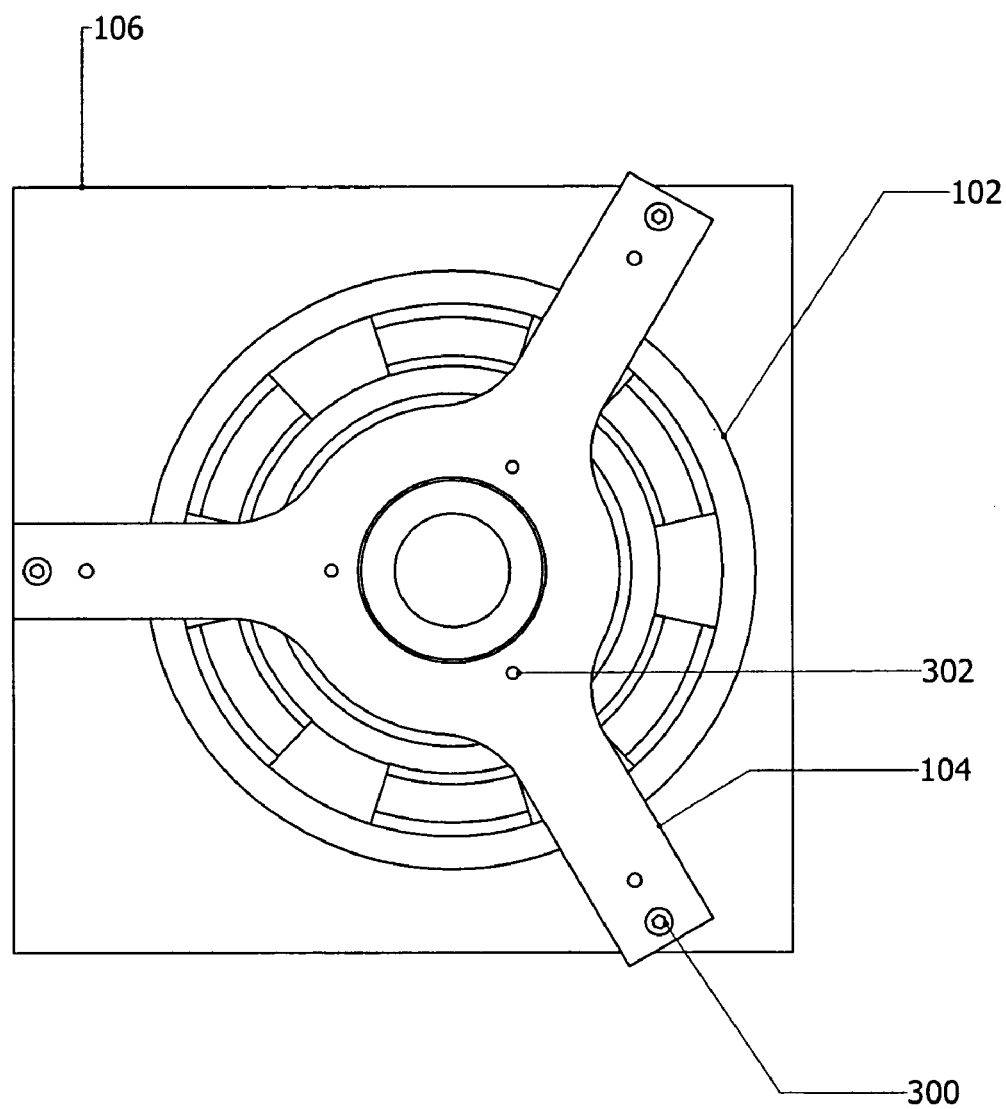
FIG. 6 is a top view of an embodiment of the source of seismic energy.
Figure 7:
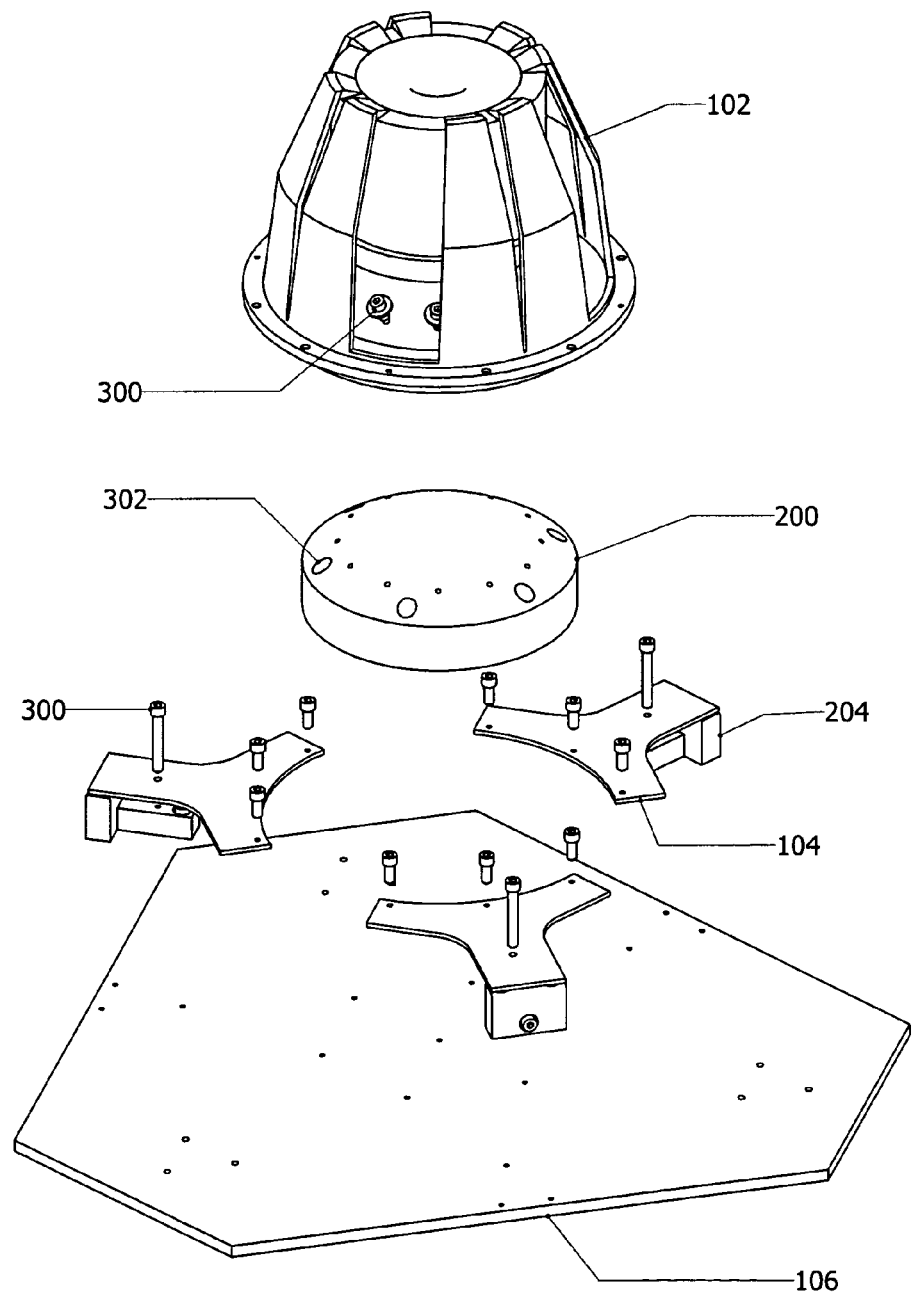
FIG. 7 is an isometric view of an embodiment of the source of seismic energy.
Figure 8:
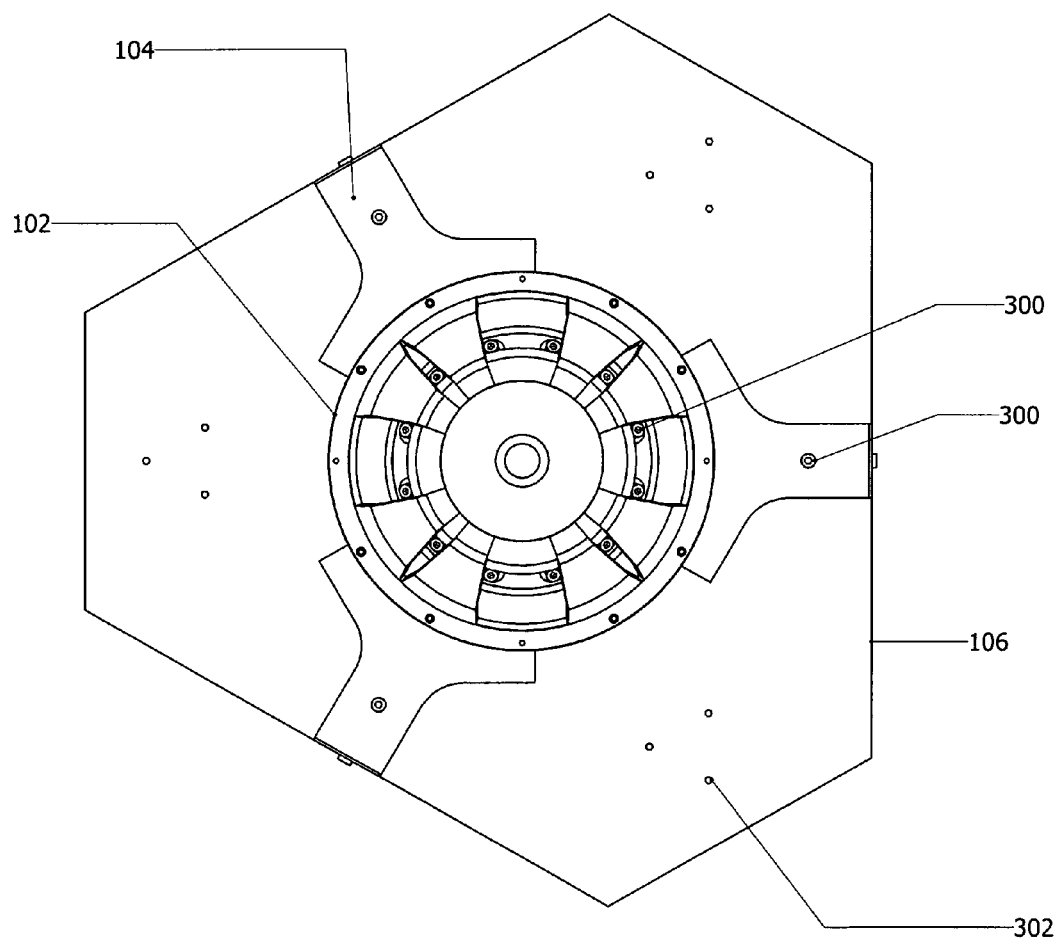
FIG. 8 is a top view of an embodiment of the source of seismic energy.

The source of periodic, frequency-locked, unmodulated seismic energy further comprises an inertial mass 102, as shown in FIGS. 2-5 and 7, coupled to the transducer 100, as shown in FIG. 2. The transducer 100 causes the inertial mass's 102 periodic movement, which creates the periodic seismic waves. In an embodiment, wherein the transducer 100 is an electromagnetic transducer, the inertial mass 102 comprises the second magnet of the electromagnetic transducer and any structures attached to the second magnet that move relative to the transducer 100, as shown in FIGS. 5 and 7.

The source of periodic, frequency-locked, unmodulated seismic energy further comprises a pressure plate 106 coupled to the transducer 100, as shown in FIGS. 2-8. The pressure plate 106 mounts the system to the earth. The amount of force used to mount the system to the earth is critical for obtaining good transmission of the seismic waves generated by the transducer 100. The greater the force, the more completely the signal is transmitted.

In an embodiment, wherein the transducer 100 is NOT mounted directly to the earth, as shown in FIG. 2, the pressure plate 106 will conduct the seismic waves produced by the transducer 100 to the earth. In this embodiment, the pressure plate 106 is preferably made of low damping material, such as metal or hard plastic in order to conduct the seismic waves generated by the transducer 100. The pressure plate 106 is mounted to the earth by fasteners 300, such as nails, screws, compression screws, augers, bolts, cement or epoxy; or by way of a mounting system, such as scaffolding, hydraulics, or mechanical jacks.

In an embodiment, wherein the transducer 100 is mounted directly to the earth, the pressure plate 106 need not conduct the seismic waves to the earth. In this embodiment, the pressure plate 106 comprises fasteners, such as nails, screws, compression screws, augers, bolts; cement or epoxy for mounting the transducer 100 to the earth. Again, the greater the force used to mount the transducer 100, the more completely the signal is transmitted.

The source of periodic, frequency-locked, unmodulated seismic energy is mounted to the earth by the pressure plate 106. The seismic waves travel through the earth and are detected by the receiver. The receiver, as shown in FIG. 1, comprises a geophone 26, an amplifier 42, an analog to digital converter 30, and a processing unit 32. The geophone 26 of the receiver is coupled to the earth in order to detect the seismic waves generated by the system. In an embodiment, one or more geophones 26 may be used. In addition, microphones can be used in lieu of geophones.

As shown in FIG. 1, the receiver further comprises an amplifier 42 coupled to the geophone 26 to amplify the analog signal generated by the geophone 26.

As shown in FIG. 1, the receiver further comprises an analog to digital ("A/D") converter 30 coupled to the amplifier 42, which converts the signal into a digital format.

As shown in FIG. 1, the receiver further comprises a processing unit 32 coupled to the A/D convertor 30. The processing unit 32 performs frequency content identification of the signal. The frequency content identification performed by the processing unit 32 using an algorithm selected from the group consisting of Fourier transforms, wavelet transforms, digital finite impulse response filters and digital infinite impulse response filters. An embodiment of the processing unit 32 comprises an interface, which graphically displays the results to the user of the equipment in real time. An embodiment of the processing unit 32 of the present invention stores the data.

An embodiment of the present invention comprises an adaptor 200, as shown in FIGS. 5 and 7, engaging the transducer 100 and attached to the pressure plate 106 for conducting the seismic waves produced by the transducer 100 to the pressure plate 106. The adaptor 200 is preferably made of low damping material, such as metal or hard plastic in order to conduct the seismic waves generated by the transducer 100 to the pressure plate 106.

An embodiment of the present invention further comprises a bearing system 104, as shown in FIGS. 5-8, engaging the inertial mass 102 and coupled to the pressure plate 106 for limiting the inertial mass's 102 off axis motion. A bearing system 104, generally, has two functions: 1) to limit off axis motion of the inertial mass 102, so that the movement of the inertial mass 102 is linear in nature; and 2) to provide a restorative force in order to bring the inertial mass 102 back to a neutral starting position after each movement. The bearing system 104 of the present invention need not provide both functions as different types of transducers may have one of the above functions built-in. In addition, the bearing system need not be an additional structure. For example, in an embodiment, wherein the transducer comprises a linear motor, the bearing system is built into the transducer. There, the off axis motion is limited by the structure itself as often linear motors comprise a rod moving within a cylinder, or a column moving with in a channel. In addition the restorative force function is often built-in. For example, in an electromagnetic linear motor, upon the application of a current the electromagnet repels the inertial mass 102, and as the current is removed the inertial mass 102 moves back to its original, neutral position.

In an embodiment comprising a bearing system 104, the embodiment further comprises mounting brackets 204, as shown in FIGS. 3, 4, 5 and 7, attached to the bearing system 104 and attached to the pressure plate 106. The mounting brackets 204 are adjustable in order to modify the center of travel of the inertial mass 102.

Figure 9:
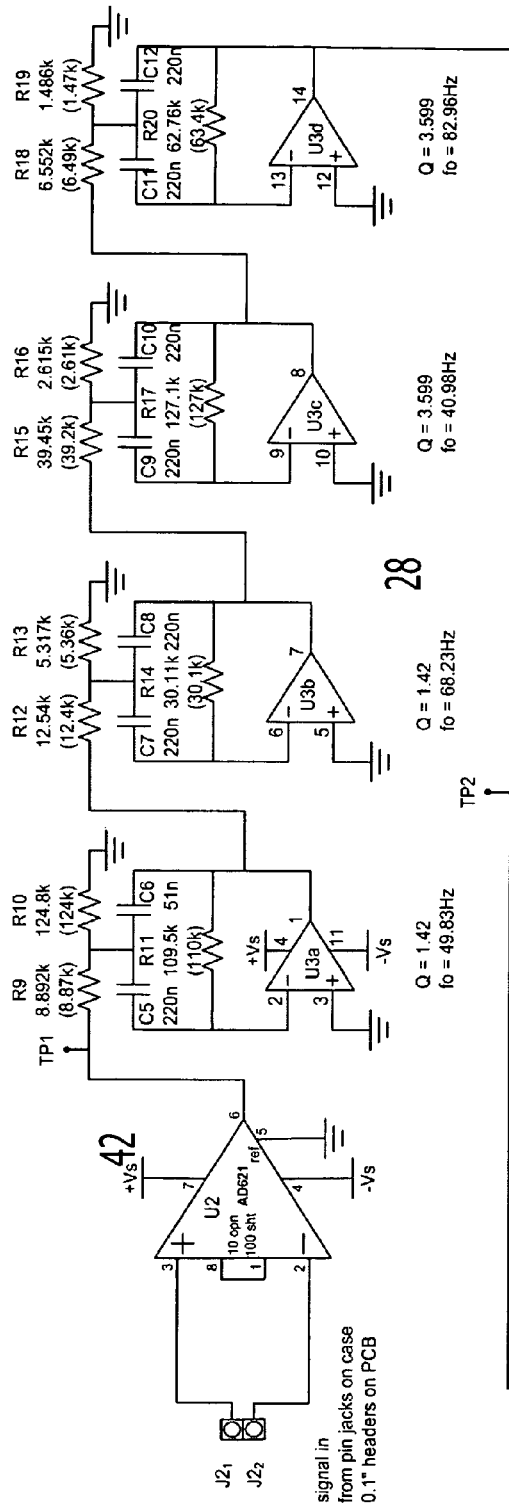
FIG. 9 is a circuit diagram of a portion of the receiver of an embodiment of the present invention.
Figure 9:
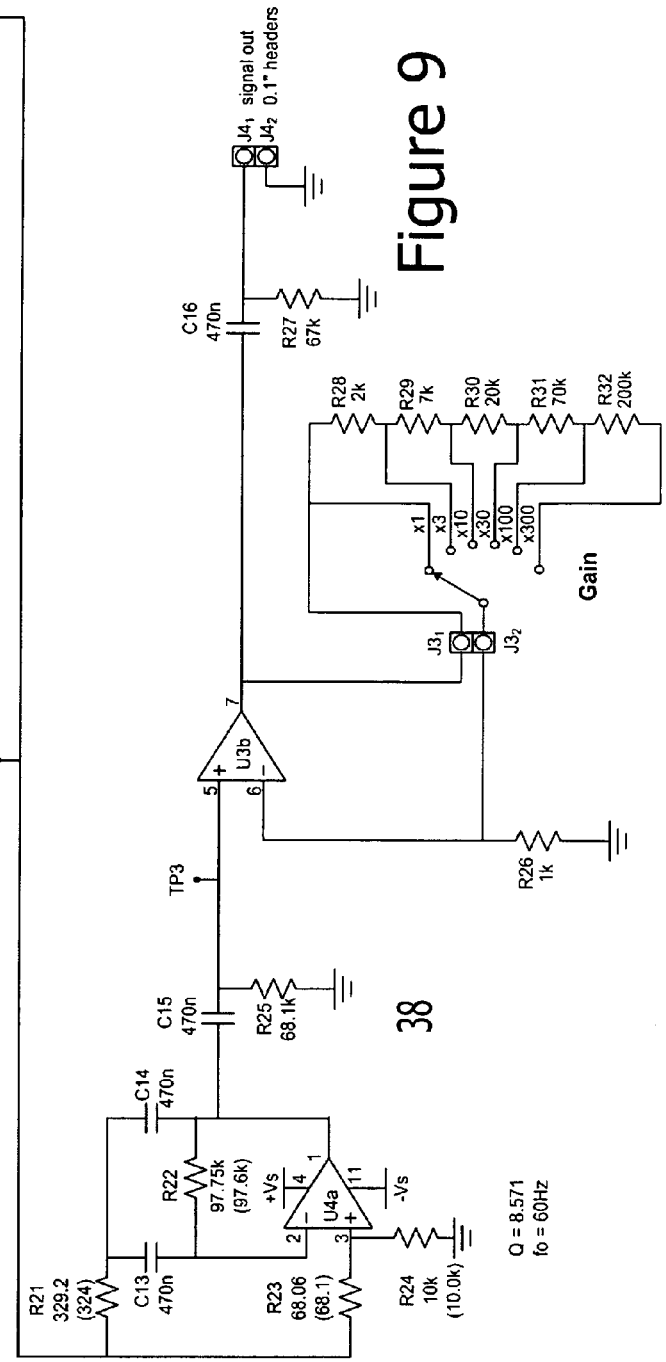

In an embodiment of present invention, the receiver further comprises an additional amplifier 62 and filters 28, 38, as shown in FIG. 1. FIG. 9 illustrates the electronic circuit of an amplifier 42 and filters 28 and 38. Filtering is well known in the art and can be used to suppress noise or other unwanted signals. Filtering techniques such as high pass filters, low pass filters, band pass filters and notch filters may be used.

A method according to the present invention for transmitting seismic waves through the earth comprises creating a continuous, periodic, frequency-locked electrical signal, transducing the continuous signal into seismic waves that pass through the earth, receiving the seismic waves from the earth, transducing seismic waves into an electrical signal, passing the electrical signal through signal processing stages comprising amplification and filtering, in any order, converting the analog signal into a digital signal, and identifying the frequency content of the signal.

The present invention provides one-way underground to surface communication and can provide for two-way communication, including surface to underground as transmitters can be placed on the surface and the portable receivers can be used underground.

The system can produce multiple frequencies simultaneously, which enables the transmission of multiple distinct messages from a single transmitter. An example of the multiple messages could include the pre-selected frequency specific to the safe zone, a pre-selected frequency identifying the number of survivors, and pre-selected frequency identifying the condition of the survivors.

PREFERRED EMBODIMENT

The oscillator 20 of the preferred embodiment comprises a digitally-synthesized oscillator 20 that transmits a continuous, low frequency sine wave signal. The oscillator 20 of the preferred embodiment generates a pure sinusoid or other frequency-locked, periodic wave form. The frequency selected for use in the preferred embodiment was between 40 Hz to 85 Hz. These frequencies were chosen because large environmental noise sources were found below 40 Hz and it was discovered that the earth severely attenuates signals over 85 Hz. The amplifier 22 of the preferred embodiment amplifies the signal to at least 100 watts ("W"), more preferably to 200 W, most preferably to 1000 W. During testing the transmitter 24 was powered by a 12 volt direct current ("DC") power supply derived from an alternating current ("AC") source, although a battery supply would be used in the field. There is a monotonically increasing relationship between power transmitted and power received.

The transducer 100 and inertial mass 102 of the preferred embodiment were constructed from a modified speaker mounted in a rigid frame, as shown in FIGS. 5 and 7. The transducer 100 of the preferred embodiment is the speaker's voice coil, an electromagnet. The inertial mass 102 of the preferred embodiment is a magnet of the speaker and any structures attached to the magnet that move relative to the transducer 100. The inertial mass 102 of the preferred embodiment, as shown in FIGS. 5 and 7, further comprises the frame of the speaker. The vertical motion of the inertial mass 102 of the preferred embodiment is transduced into seismic waves in the form of longitudinal P waves. P waves are the fastest kind of seismic wave. A longitudinal P wave has the ability to move through solid rock and fluid rock, like water or the semi-liquid layers of the earth. It pushes and pulls the rock it moves through in the same way sound waves push and pull the air.

The pressure plate 106 of the preferred embodiment is coupled to the transducer 100 and mounted to the earth. The pressure plate 106 is mounted to the earth with a mounting system, similar to scaffolding.

The preferred embodiment of the present invention further comprises an adaptor 200, as shown in FIGS. 5 and 7, engaging the transducer 100 and attached to the pressure plate 106 for conducting the seismic waves produced by the transducer 100 to the pressure plate 106.

The preferred embodiment of the present invention further comprises a bearing system 104, as shown in FIGS. 5-8, engaging the inertial mass 102 and coupled to the pressure plate 106 for limiting the inertial mass's 102 off axis motion and providing a restoring force to the inertial mass 102.

The preferred embodiment of the present invention further comprises mounting brackets 204, as shown in FIGS. 5-8, attached to the bearing system 104 and attached to the pressure plate 106; wherein the mounting brackets 204 are adjustable in order to modify the center of travel of the inertial mass 102. As shown in FIGS. 5-8, the preferred embodiment comprises fasteners 300 that pass through the fastener holes 302 to attach the bearing system 104 to the inertial mass 102, to attach the bearing system 104 to the mounting brackets 204, to attach the mounting brackets 204 to the pressure plate 106, and to attach the adaptor 200 to the pressure plate 106.

The receiver of the preferred embodiment, as shown in FIG. 1, comprises a geophone 26 coupled to the earth, a differential amplifier 42 coupled to the geophone 26, a filter 28, 38 coupled to the differential amplifier 42, an amplifier 62 coupled to the filter 28, 38, an A/D converter 30 coupled to the amplifier 62, and a processing unit 32 coupled to the A/D converter 30 for frequency content identification of the signal. The processing unit 32 of the preferred embodiment performs Fourier transforms in order to identify the power in all received signal frequencies.

The geophone 26 of the receiver collects the signal from the ground. At this stage the signal remains 100,000 times weaker than the ambient noise. The differential amplifier 42 of the preferred embodiment is coupled to the geophone 26, as shown in FIG. 1. The filter 28, 38 of the preferred embodiment, as shown in FIG. 1, comprises a high-quality ("Q") bandpass analog filter. The purpose of the filter 28, 38 is two fold; it removes powerful noise sources near the signal frequency such as at 60 Hz, it also serves as an anti-aliasing filter prior to sampling. The filters of the preferred embodiment further comprise a fourth order bandpass 28 and one second order notch filter 38, as shown in FIG. 1. Early frequency sweep experiments indicated the least near-surface signal attenuation occurred between 45 and 85 Hz, so these frequencies were chosen as the bandpass corner frequencies. A 60 Hz twin-T notch filter 38 was employed to reduce capacitively-coupled 60 Hz noise. At this stage the ambient noise is still 10,000 times more powerful than the signal power. The amplifier 62 of the preferred embodiment is coupled to the filter 28, 38. The analog to digital ("A/D") convertor of the preferred embodiment is coupled to the amplifier 62, as shown in FIG. 1. The A/D of the preferred embodiment digitizes the signal, including the noise. The processing unit 32 of the preferred embodiment comprises a custom MATLAB application created for performing the Fourier transforms, logging the data, and graphically displaying the results in real time. The signal is sampled at a rate at least twice the frequency of the highest frequency sent.

Fourier analysis integrates the power received into frequency-specific energy bins. This enhances the received signal to noise ratio in two-ways. First, the percentage of total received noise energy that exists within a particular frequency bandwidth is proportional to the bandwidth. As the length of time that the received signal is measured increases, Fourier analysis permits the resolved bandwidth to shrink to about 1/(total time received), reducing the noise energy. The seismic energy signal is not reduced by limiting its bandwidth since it is frequency-locked by a quartz crystal to essentially zero bandwidth. Second, any noise component from a zero-mean additive white Gaussian source has an root mean square ("RMS") energy that grows as the square root of time, but the received signal has an RMS energy that grows linearly with time. As Fourier analysis is continuously performed on the received signal, over a number of minutes, the signal to noise ratio increases by a factor of nearly one million. The processed output has an extremely low probability of a type-one error, falsely indicating a survivor signal.

The signal can be extracted from the noise, despite being a small fraction of the environmental noise. Experimental data shows received signal power declines as $1/r^2$ with the distance from transmitter 24, as would be expected from Gauss' Law. Given that the preferred embodiment has detected a signal at 200 feet in less than one minute, it can be expected to collect a valid signal 400 feet above ground from the transmitter in 4 minutes.

ADVANTAGES

The previously described versions of the invention have many advantages, including the following:

1. A frequency-locked signal has an extremely low error rate, as the signal can be effectively separated from the ambient noise and interference using frequency content identification. This is especially important in mine emergencies where the signal needs to be separated from the noise of rescue vehicles and mine noises.
2. Multiple transmitters each located within separate safe zones can simultaneously send signals without interfering with each other since the signals are unmodulated, and frequency-locked to specific pre-selected frequencies.
3. The system provides for two-way communication, including underground to surface and surface to underground as transmitters can be placed on the surface and the portable receivers can be used underground.
4. The low frequency seismic waves are able to reach the receiver even in earth that comprises non uniform rock, and clay with air and water pockets as seismic energy travels through each of these medium.
5. Seismic waves are unaffected by the electrical conductivity of the earth, unlike radio waves.
6. The system can produce multiple frequencies simultaneously, which enables the transmission of multiple distinct messages from a single transmitter. An example of the multiple messages could include the pre-selected frequency specific to the safe zone, a pre-selected frequency identifying the number of survivors, and pre-selected frequency identifying the condition of the survivors.

7. The system is compact and less expensive than alternatives as it does not require extensive infrastructure, such as loop antennas of greater than 100 feet circumference.

It is not necessary for every embodiment of the present invention to incorporate every advantage.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for the transmission of seismic waves through the earth comprising:
   a source of periodic, frequency-locked, unmodulated seismic energy comprising
      an oscillator for generating a signal, wherein the oscillator is a frequency-locked, electrical oscillator;
      an amplifier coupled to the oscillator;
      a transducer driven by the oscillator, wherein the transducer is an electromagnetic transducer comprising a first and a second magnet, wherein the first magnet is an electromagnet driven by the oscillator;
      an inertial mass coupled to the transducer, wherein the inertial mass's periodic movement caused by the transducer creates periodic seismic waves, wherein the inertial mass comprises the second magnet of the electromagnet and any structures attached to the second magnet that move relative to the transducer;
      a pressure plate coupled to the transducer for mounting to the earth;
      an adaptor engaging the transducer and attached to the pressure plate for conducting the seismic waves produced by the transducer to the pressure plate;
      a bearing system engaging the inertial mass and coupled to the pressure plate for limiting the inertial mass's off axis motion and providing a restoring force to the inertial mass;
      mounting brackets attached to the bearing system and attached to the pressure plate, wherein the mounting brackets are adjustable in order to modify the center of travel of the inertial mass;
   a receiver comprising
      a geophone coupled to the earth;
      a differential amplifier coupled to the geophone;
      a filter coupled to the differential amplifier;
      an amplifier coupled to the filter;
      an analog to digital converter coupled to the amplifier;
      a processing unit coupled to the analog to digital converter for frequency content identification of the signal, wherein the processing unit performs Fourier transforms in order to identify the power in all received signal frequencies.

2. A method for the transmission of seismic waves through the earth comprising
   creating a continuous, periodic, frequency-locked electrical signal;
   transducing the continuous signal into seismic waves that pass through the earth;
   receiving the seismic waves from the earth;
   transducing seismic waves into an electrical signal;
   passing the electrical signal through signal processing stages comprising amplification and filtering, in any order;
   converting the analog signal into a digital signal;
   identifying the frequency content of the signal.

* * * * *